United States Patent [19]

Yoder

[11] 3,967,743
[45] July 6, 1976

[54] TRAILER CONSTRUCTION
[76] Inventor: John W. Yoder, P.O. Box 1337, Cumberland, Md. 21502
[22] Filed: Oct. 4, 1974
[21] Appl. No.: 512,318

[52] U.S. Cl. .............................. 214/390; 214/512; 280/638
[51] Int. Cl.² ......................................... B60P 3/40
[58] Field of Search .......... 214/512, 390, 392, 394, 214/505, 506; 280/34 A

[56] References Cited
UNITED STATES PATENTS

| | | | |
|---|---|---|---|
| 2,547,269 | 4/1951 | Kinsey | 214/390 |
| 2,801,864 | 8/1957 | Raney et al. | 280/34 A X |
| 2,834,599 | 5/1958 | Sarchet | 280/34 A X |
| 3,045,848 | 7/1962 | Christenson et al. | 214/392 |
| 3,330,574 | 7/1967 | Kulyk | 214/505 X |
| 3,348,711 | 10/1967 | Gove | 280/34 A X |
| 3,520,430 | 7/1970 | Dunbar | 214/512 X |
| 3,747,788 | 7/1973 | Petetin | 214/512 |

Primary Examiner—Albert J. Makay
Attorney, Agent, or Firm—LeBlanc & Shur

[57] ABSTRACT

Disclosed is a tractor trailer construction wherein the trailer has a pair of spaced side trusses each having an upper beam and a depending support for carrying a load. Telescoping connections under the control of fluid actuated cylinders are located between the trusses at opposite ends of the trailer whereby the trusses can be moved toward and away from one another for loading and unloading. The tractor is releasably coupled to the connection at the forward end of the trailer and a rear axle unit underlies the opposite rear end of the trailer. To load the trailer, dollies are provided to support the front end of the trailer and the tractor and connection between the trusses at the front end of the trailer are removed leaving the trailer open-ended. The trailer is then moved to straddle the load with the trusses lying on opposite sides of the load. The tractor is then reconnected, and the dollies are removed. The trusses are moved toward one another and are raised to engage and support the load. To unload the trailer, fluid actuated cylinders raise the side trusses and load slightly whereupon the load is blocked. The side trusses are then lowered and displaced laterally away from one another. The tractor and the connection between the trusses at the forward end of the trailer are removed. The tractor is coupled to the rear axle unit and pulls the trailer clear of the load.

4 Claims, 20 Drawing Figures

TRAILER CONSTRUCTION

The present invention relates to a tractor trailer construction and particularly relates to a tractor trailer construction of the straddle carrier type for hauling oversize loads, i.e., oversized in height, width and/or length.

Many and various types of trailer constructions have been proposed and constructed in the past. One type of such constructions is conventionally known as the low boy. One conventional low boy trailer design provides an elongated deck, about 34 feet in length, and has a 12 ton capacity. In this conventional design, beams of substantial height, i.e., about 12 inches, are utilized. When this beam height is added to the ground clearance provided, i.e., about 10 inches, the low boy deck lies at a minimum of twenty-two inches above the load. Low boy trailer constructions, while eminently suitable and quite satisfactory for conventional loads, cannot be effectively and economically used to carry oversize loads. For example, the maximum combined height for a truck and its load when travelling on roads in most states is 13 feet six inches and the maximum width is 12 feet. Most states routinely grant permits as long as these height and width limitations are not exceeded. When the combined height and/or width of the load when loaded on the trailer exceeds these limits, permits are virtually impossible to obtain, and when obtained require escorts, detailed surveys, notification of utility companies and municipalities, all of which is time consuming, burdensome and uneconomical.

Furthermore, conventional low boy trailer designs as most other conventional trailer constructions merely provide a rigid deck supported at opposite ends by a rear axle and a tractor unit. Auxiliary devices such as air lifts, forklifts, winches, power cranes, etc. are normally required and conventionally used to lift and set the load on such decks and to remove the load therefrom. As will be appreciated, this requires additional men and machinery which significantly add to the overall cost of transporting a particular load.

Accordingly, there has arisen the need for a tractor trailer construction which can transport loads oversize in width and/or height and/or length (within the dimensional limitations imposed by most state laws) and also for a trailer construction which can be self-loading and unloading without the additional men or machinery currently utilized to load and unload conventional trailer constructions. To this end, the present invention provides a novel and improved tractor trailer construction having various advantages in construction, operation and result, in comparison with such prior trailer designs and constructions. Particularly, the present trailer construction provides a tractor trailer construction comprised of a pair of spaced side trusses each including an upper beam, a plurality of structural elements depending from the beam, and an inwardly angled load support connected to the lower end of the depending structural elements. Connections are provided between the trusses at each of their opposite ends with each connection including a pair of guide tubes and a pair of elements carried at each end of the side trusses, which elements are telescopically receivable within the guide tubes. The forward guide tubes are mounted on a plate having a dependent pin for releasably coupling the forward end of the trailer with the slotted plate of a fifth wheel on a tractor. The guide tubes at the rear of the trailer are carried on a plate mounted on the wheeled rear axle. Fluid actuated cylinders cooperate between the guide tubes at the front and rear ends of the trailer and each of the side trusses whereby the trusses are movable toward and away from one another for reasons that will become apparent from the ensuing description. The outer ends of the telescopically receivable elements also carry open ended guide channel boxes for telescopically receiving the ends of the truss beams. Pinned connections are provided between the beams and the guide channel boxes for releasably securing the side trusses and end connections one to the other in longitudinally adjusted positions whereby the overall length of the trailer construction is selectively adjustable.

It will be appreciated from the foregoing brief description of the trailer construction hereof that the area between the side trusses and end connections is open and void of a deck as is provided in most conventional trailer constructions and that the load is supported by the lower supports which depend from the upper beams of the trusses. Thus, the side load supports are located close to the road with minimum clearance therebetween and can be located adjustable distances from the road, for example, two inches or more by means of fluid lifts carried by the rear axle and fifth wheel. Consequently, the overall height of the load can be increased up to the permissible road height in comparison with conventional trailer constructions which have a much higher deck on which the load rests.

When a load is straddled by both the end connections and side trusses, the trailer construction hereof can be readily self unloaded. To accomplish this, the rear axle and fifth wheel lifts are actuated to slightly elevate the side trusses and end connections and hence the entire load. The load is then blocked for support and the side trusses and end connections are lowered to space the side load supports below the load. The fluid actuated cylinders carried by the end connections are then actuated to move the side trusses away from one another and away from the load. Thereafter, dollies are positioned to support the forward end of the trailer enabling disconnection and removal of the tractor including the forward end connection from the trailer leaving the forward end of the trailer open. The tractor is then moved to the rear of the trailer and connected to the rear axle whereupon the tractor can move the trailer away from the load until the side trusses clear the load. The tractor and the front end connection carried thereby are then reconnected to the forward ends of the side trusses and the dollies are removed. The side trusses are then moved toward one another whereby the trailer is returned to a standard width. The trailer is also self-loading and this operation is substantially the reverse of the foregoing described self-unloading operation as described in detail hereinafter.

Accordingly, it is a primary object of the present invention to provide a novel and improved trailer construction.

It is another object of the present invention to provide a novel and improved trailer construction of the straddle carrier type wherein oversized loads in length and/or height and/or width can be readily and easily transported.

It is still another object of the present invention to provide a novel and improved tractor trailer construction of the straddle carrier type wherein the trailer construction has the capability for both self-unloading or self-loading.

It is a further object of the present invention to provide a novel and improved trailer construction having side trusses movable toward and away from one another for supporting loads of variable widths and for supporting such loads with minimum road clearance whereby loads of increased heights can be transported.

It is a still further object of the present invention to provide a novel and improved trailer construction of the straddle carrier type which can be readily, easily and economically fabricated.

It is a related object of the present invention to provide novel and improved methods for loading and unloading trailers.

These and further objects and advantages of the present invention will become more apparent upon reference to the following specification, appended claims and drawings wherein:

Referring now to the drawings, particularly to FIGS. 1-4, there is illustrated a trailer, generally designated 10, constructed in accordance with the present invention and comprised of a pair of spaced generally parallel side trusses 12 and 14 joined one to the other at their opposite ends by respective forward and rear connections generally designated 16 and 18. As will be apparent from a review of FIGS. 2 and 4, the side trusses 12 and 14 and end connections 16 and 18 form a generally rectangular enclosure for receiving and supporting a load in a manner which will become clear from ensuing description. Each side truss 12 and 14 includes a side generally channel shaped beam 20 which may be continuous or formed of a plurality of channel shaped beams welded in endwise relation one to the other. Adjacent opposite ends of each beam there are provided outer cover plates 22 and 24, respectively, disposed between the outwardly directed flanges of the main channel shaped beam 20.

Figure 13:
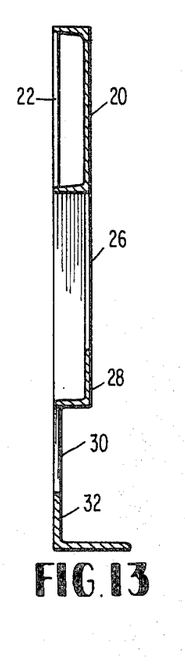
FIG. 13 is a cross-sectional view thereof taken generally about on line 13—13 in FIG. 1.

Each side truss 12 and 14 is further comprised of a plurality of support elements or webs 26 dependent from each main beam 20 at longitudinally spaced positions therealong, each support element 26 comprising an angle secured at its upper end to beam 20 and at its lower end to a generally longitudinally extending angle 28. A plurality of plates 30 are disposed at longitudinally spaced positions along each truss between the longitudinally extending rail 28 and a lower support member 32. Member 32 comprises an elongated angle having its flange 42 turned inwardly toward the opposite truss. At opposite ends of the rail 28 of each truss, diagonals 34 and 36 incline upwardly toward main beam 20 and diagonals 36. Plates 40 depend from diagonals 34 and 36 for connection at their lower ends with elongated support member 32. It will be appreciated that the longitudinally extending flanges of the elements 26, rail 28 and support member 32 as well as the plates of each truss 30 all lie on a common plane as illustrated in FIG. 13 whereby, with the exception of the inturned flange 42 of each lower support member 32, such elements present a smooth interior wall surface. For reasons which will become apparent from the following description, the upper and lower flanges of main beam 20 are provided with pairs of pinholes 42 at longitudinally spaced positions therealong adjacent the forward and rear portions of trailer 10.

Figure 1:
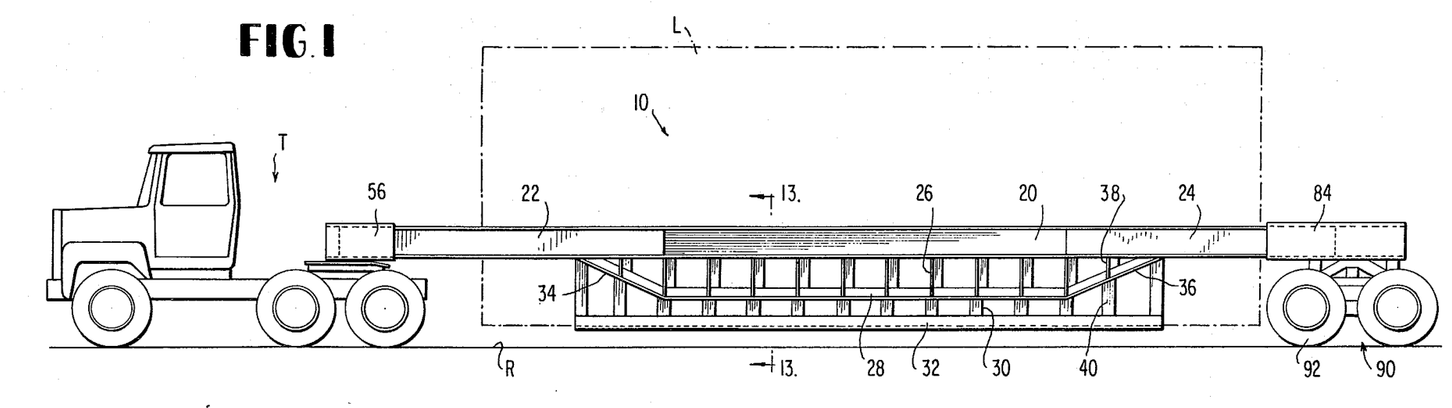
FIG. 1 is a side elevational view of a tractor trailer constructed in accordance with the present invention and illustrated in a fully loaded and travel condition.
Figure 2:
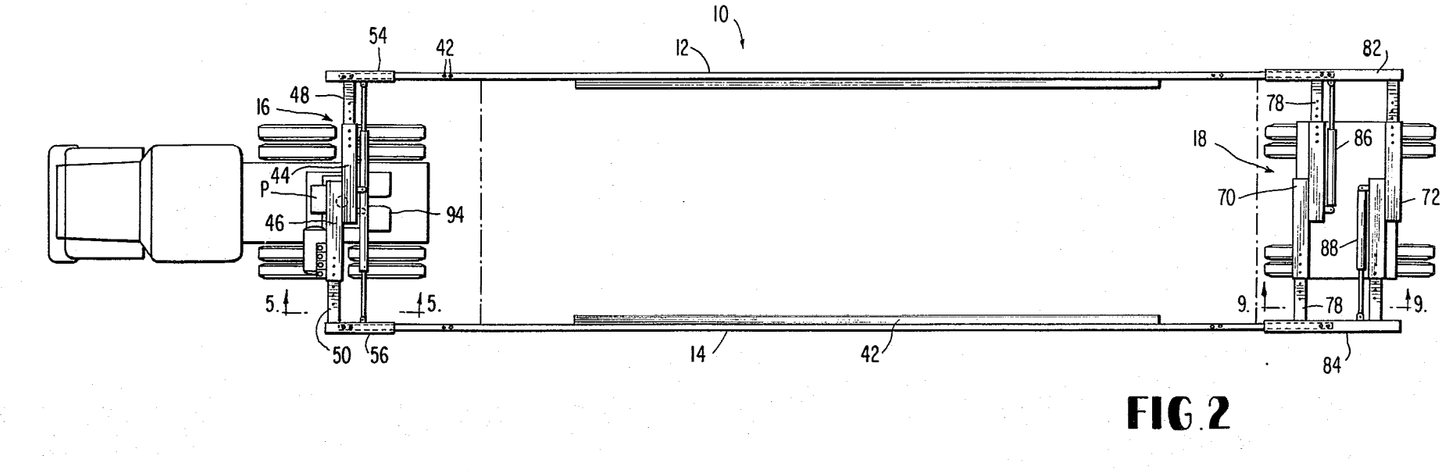
FIG. 2 is a plan view of the trailer construction illustrated in FIG. 1.
Figure 3:
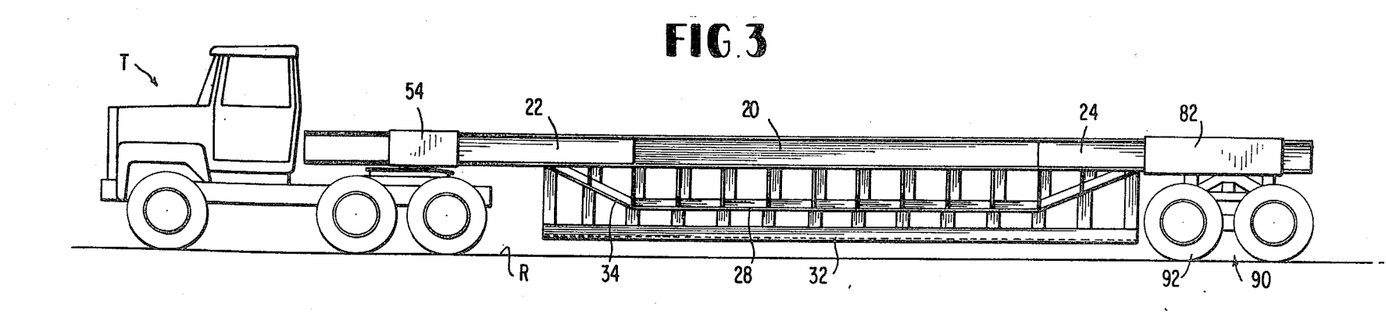
FIG. 3 is a view similar to FIG. 1 and illustrates the trailer construction hereof in an unloaded travel condition.
Figure 4:
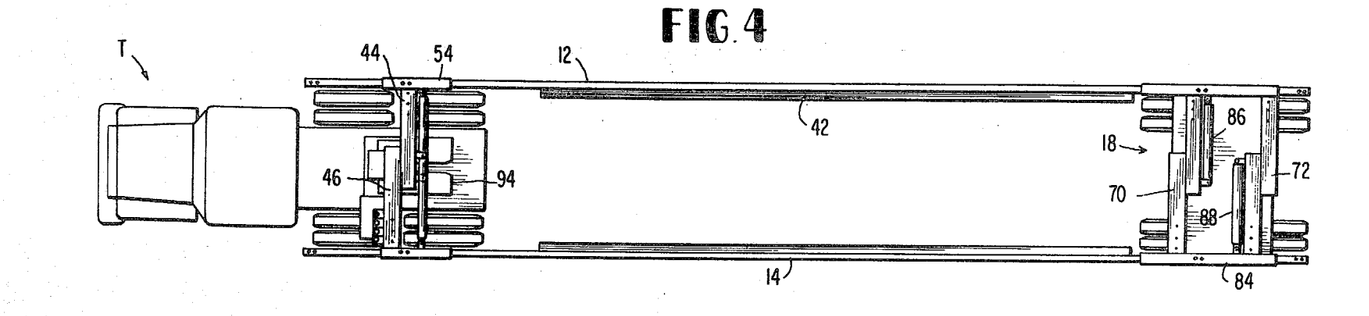
FIG. 4 is a top plan view thereof.
Figure 5:
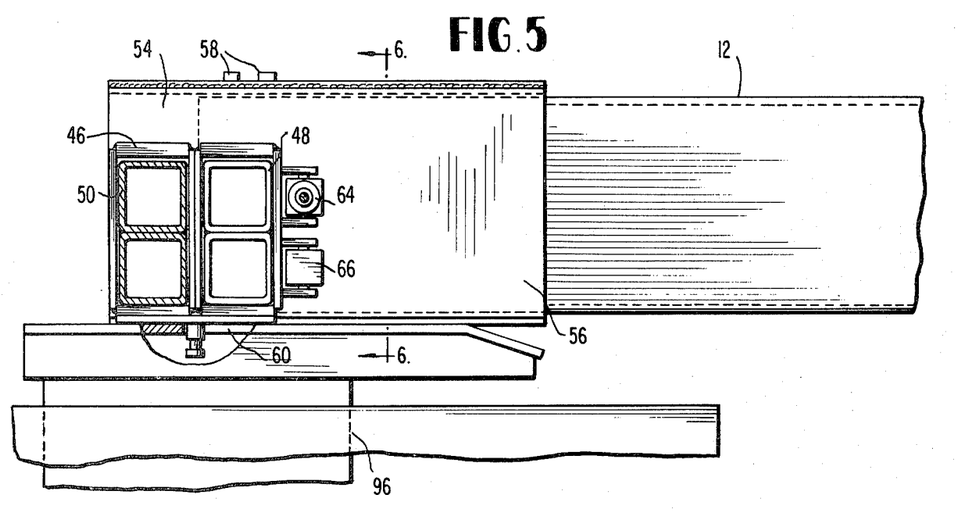
FIG. 5 is an enlarged fragmentary cross-sectional view of the trailer construction hereof taken generally about on line 5—5 of FIG. 2.
Figure 6:
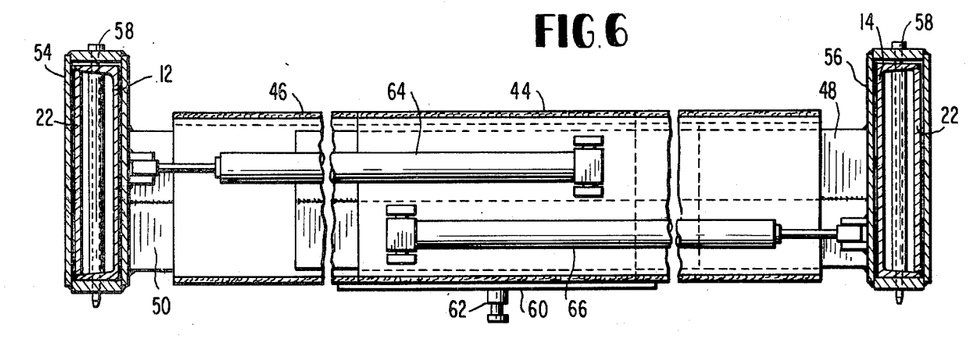
FIG. 6 is a fragmentary cross-sectional view with parts broken out for ease of illustration and taken generally about on line 6—6 in FIG. 5.

The forward end connection 16 between the forward ends of trusses 12 and 14 is best illustrated in FIGS. 5 and 6 in conjunction with FIGS. 1 and 2. Particularly, the forward end connection 16 includes an outer tube assembly including a pair of substantially rectangular shaped tubes 44 and 46 respectively overlapped and secured one to the other adjacent opposite ends such that the outer or lateral ends of tubes 44 and 46 project beyond the inner ends of the opposite tube. Tubes 44 and 46 are longitudinally offset one from the other. As illustrated in FIG. 2, tubes 44–46 are preferably built up of flat plates welded one to the other although other types of construction and cross-sectional shapes can be utilized. Telescopically received within tubes 44 and 46 projecting from their outer ends are inner tube assemblies 48 and 50 respectively. To provide the required strength, the inner tube assemblies 48 and 50 each may comprise a pair of square tubes disposed one on top of the other and welded together. A series of openings are provided in each of the outer and inner tube assemblies which, when the side trusses are adjusted in width and the openings are aligned, receive locking pins for locking the side trusses in selected adjustable position relative to one another.

The outer ends of the inner tube assemblies 48 and 50 are each secured along the inside surface of longitudinally extending generally rectangular shaped channel boxes 52 and 54, respectively. These channel boxes may be built up from flat plate stock welded together.

The forward ends of the beams 20 and the forward ends of plate 22 which with beams 20 form box beams at the forward end of the trailer, are telecopically received within the channel boxes 54 and 56, respectively. Pins 58 are received through the openings 42 in the flanges of the box beams and through corresponding openings in the upper and lower edges of the channel boxes whereby the box beams can be secured in the channel boxes at adjusted longitudinally spaced position relative thereto.

The outer tube assembly is secured to a plate 60. Depending from plate 60 is a pin 62 which cooperates with a fifth wheel on a tractor generally designated T whereby the tractor can engage and disengage from the trailer in a conventional manner.

Referring particularly to FIGS. 5 and 6, hydraulic cylinders 64 and 66 are pivotally secured at one end along the rear edge of outer tube 44. The piston rods thereof extend in opposite directions and are pivotally secured at their outer ends to the respective channel boxes 54 and 56. It will be appreciated that retraction and extension of the piston rods of cylinders 64 and 66 cause displacement of the channel boxes and hence the forward ends of the trusses 12 and 14 in directions toward and away from one another, respectively.

Figure 9:
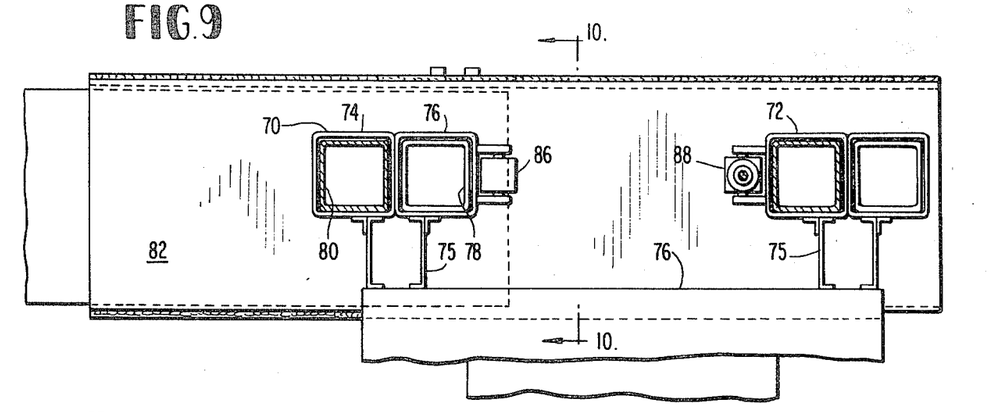
FIG. 9 is a fragmentary enlarged cross-sectional view of the trailer construction hereof taken generally about on line 9—9 in FIG. 2.
Figure 10:
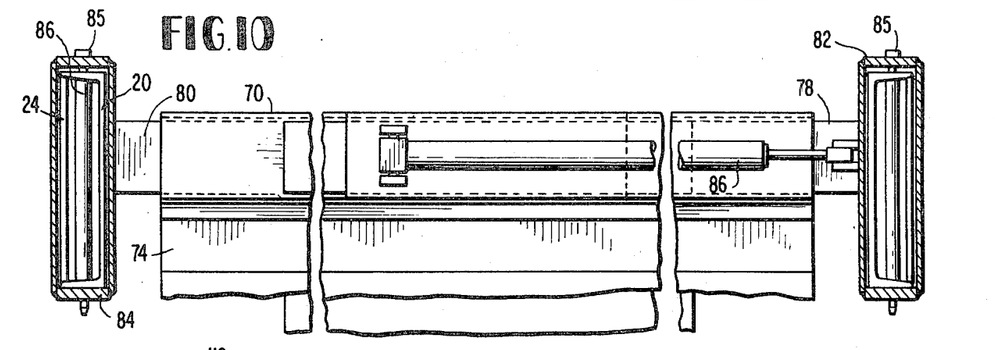
FIG. 10 is a fragmentary enlarged cross-sectional view with parts broken out for ease of illustration and taken generally about on line 10—10 in FIG. 9.

Referring now to the end connection 18 at the rear end of trailer 10, there is provided a somewhat similar telescopic connection between the rear ends of the side trusses 12 and 14, respectively. Referring now to FIGS. 9 and 10 in conjunction with FIGS. 1 and 2, rear connection 18 includes a pair of outer tube assemblies 70 and 72 longitudinally spaced one from the other with each being secured to a pair of transversely extending beams 75 in turn secured to a plate 76. Each outer tube assembly 70 and 72 comprises a pair of box-like tubes 74 and 76 having opposed ends overlapped and secured in side-by-side relation one to the other with the opposite ends extending outwardly toward opposite sides of trailer 10, the tubes 74 and 76 being longitudinally offset one from the other. Each tube 74 and 76 is adapted to telescopically receive an inner tube 78 and 80 secured at their outer ends to rear channel boxes 82 and 84, respectively. A series of openings are provided in each of the outer and inner tubes which, when the side trusses are adjusted in width and the openings are aligned, receive locking pins for locking the side trusses in selected adjustable position relative to one another. Channel boxes 82 and 84 are similar to boxes 54 and 56 previously described but are further elongated in comparison thereto. Channel boxes 82 and 84 are adapted to telescopically receive the rear ends of beam 20 and cover plate 24. Pins 85 are receivable through selected paired openings 54 in the flanges of beam 20 at the rear of the trailer and through corresponding openings in the channel boxes 82 and 84 whereby the side beams 20 are telescopically receivable within channel boxes 82 and 84 and are longitudinally adjusted relative thereto. A pair of cylinders 86 and 88 are pivotally connected at their inner ends to the outer tube assemblies 70 and 72, respectively. The piston rods of such cylinders are pivotally connected at their outer ends to the respective box beams 82 and 84. It will be appreciated that retraction and extension of the piston rod by actuation of cylinders 86 and 88 displaces the box beams and hence the rear portions of the side trusses of trailer 10 toward and away from one another respectively.

A conventional rear axle unit generally designated 90 is secured along the underside of plate 76 and in the illustrated form this comprises plural pairs of wheels 92. A conventional air lift is provided rear axle unit 90 for raising and lowering the plate 76 and hence the rear end portion of the side trusses. The fifth wheel of the tractor T carries a slotted plate 94 whereby connection and disconnection between the forward end of the trailer 10 and tractor T can be readily effected. In conventional fifth wheel construction, a conventional hydraulic cylinder or screw jack 96 (FIG. 5) is provided. That is, the forward end of the trailer including the forward end connection 16 may be raised and lowered by operation of such conventional lift carried by the fifth wheel of tractor T.

Figure 7:
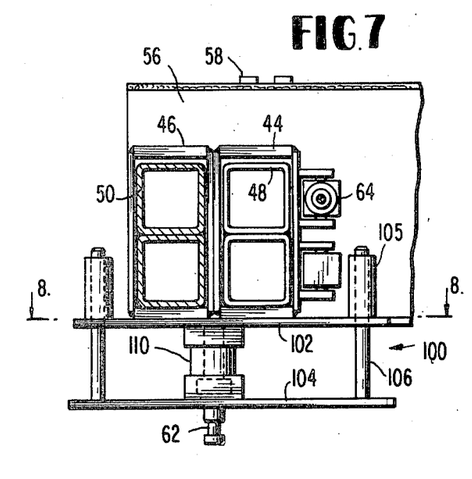
FIG. 7 is a view similar to FIG. 5 and illustrating a further embodiment of a trailer elevating mechanism.
Figure 8:
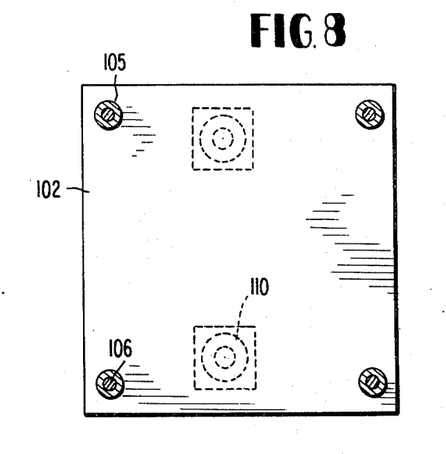
FIG. 8 is a cross-sectional view thereof taken generally about on line 8—8 in FIG. 7.

For those tractors T having a fifth wheel notequipped with a conventional lift system, trailer 10 may be provided with a lifting mechanism, such mechanism being generally designated 100 in FIGS. 7 and 8. Particularly, mechanism 100 is comprised of a pair of vertically spaced horizontally extending plates 102 and 104. Plate 102 takes the place of the plate 60 previously described and is secured along the underside of the forward outer tube assembly. Plate 102 is generally rectangular in shape and is provided with a plurality of apertures adjacent each corner as illustrated in FIG. 8. Guide sleeves 105 upstand from plate 102 about the apertures. Plate 104 is provided with a plurality of upstanding guide rods 106 adjacent its corners in telescoping relation with the apertures through plate 102 whereby relative vertical movement between plates 102 and 104 can be effected with the plates remaining in vertical registration one with the other. To effect such movement, a pair of air cylinders 110 are interposed between plates 102 and 104, the cylinders being secured to one of the plates and the piston rods thereof being secured to the opposite plate. Accordingly, by actuation of the cylinders 110, the forward end connection 16 and hence the forward end of trailer 10 can be raised or lowered relative to plate 104 as desired. The pin 62 for effecting connection between the fifth wheel and the trailer is secured to the underside of lower plate 104.

Figure 11:
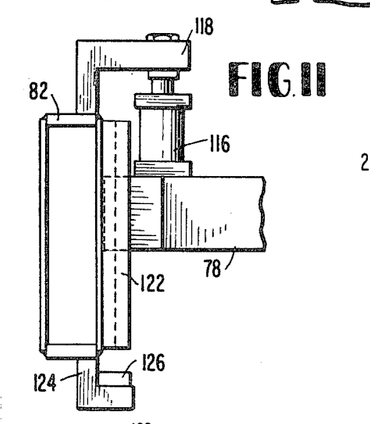
FIG. 11 is an enlarged fragmentary elevational view illustrating the connection between the side trusses and end connections for elevating the side trusses in accordance with another embodiment of the present invention.
Figure 12:
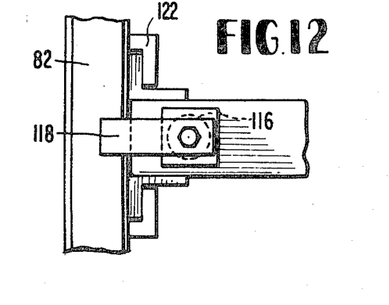
FIG. 12 is a top elevational view thereof.

It will be appreciated that the rear ends of the side trusses can be raised and lowered with airlifts, hydraulic cylinders, powered screw jacks, or other suitable lifts, not shown. An embodiment of this invention provides for a fluid actuated lift cooperable between the rear end connection 18 and the side trusses 12 and 14. Particularly, this fluid actuated lift is illustrated in FIGS. 11 and 12 and comprises a hydraulic cylinder 116 mounted adjacent the outer ends of inner tubes 78. The piston of cylinder 116 is secured to a bracket 118 connected along the top edge of the rear channel box 82. Inner tubes 78 are splined to the channel boxes for relative vertical sliding movement therebetween. For example, tube 78 illustrated in FIGS. 11 and 12 is splined to channel box 82 by means of angle brackets 120 secured along opposite sides of tube 78 and which brackets 120 cooperate with reversed angle brackets or guides 122 secured along the inside face of channel box 82. A bracket 124 depends from the lower side of channel box 82 and mounts a cushion 126. Accordingly, actuation of cylinders 116 extends and retracts their piston rods to respectively raise and lower the channel boxes and hence the rear end of trailer 10 relative to its end connection 18.

Figure 14:
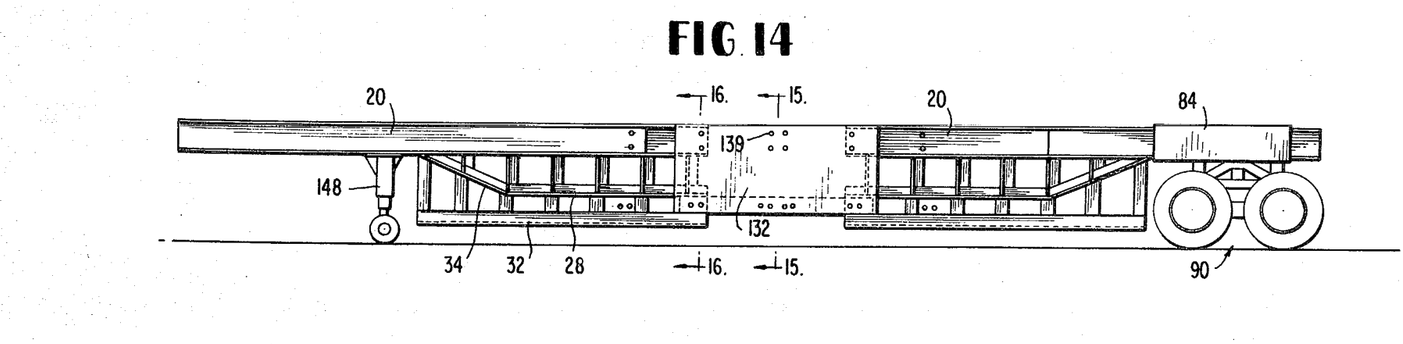
FIG. 14 is a side elevational view of the trailer utilizing a modified truss for lengthening its overall dimension.
Figure 15:
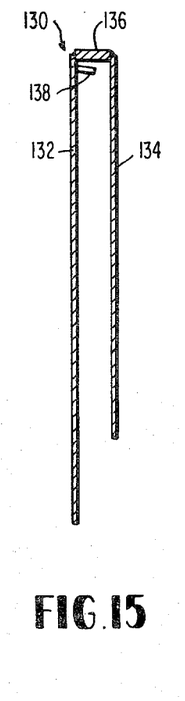
FIGS. 15 and 16 are cross-sectional views thereof taken generally about on line 15—15 and 16—16 in FIG. 14.
Figure 16:
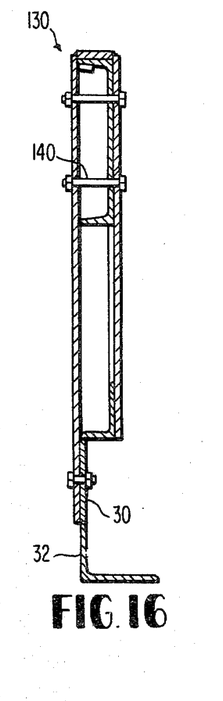

For carrying loads particularly oversized in length, a pair of inverted elongated U-shaped extension sections, generally designated 130, in FIGS. 14–16 are utilized to elongate the trusses. Particularly, each extension section 130 inclues a pair of spaced side plates 132 and 134 and an elongated top plate 136 to which the upper margins of the side plates are secured. An elongated inwardly extending element 138 is secured to the outer side plate 132 just below upper plate 136. Bolt holes 139 are located along the plates 132 and 134 in registry one with the other and similar bolt hole openings are provided in the channel beams 20 and depending plates 30. In this configuration, the trusses 12 and 14 are separable medially of their lengths such that the spaced ends are received in the opposite ends of the extension sections 130. When received in sections 130, element 138 is received below the upper flange of beam 20 and bolts 140 are passed through the openings 139 in plates 132 and 134 and through corresponding openings in the beam 20 and plates 30 to secure the opposite ends of the split trusses to the extension sections 136.

As will be appreciated from the foregoing description and from a review of FIG. 1, the load designated L is straddled by both the end connections 16 and 18 and the side trusses 12 and 14. More specifically, the load L is supported by the inwardly extending flange 42 of the angle bracket 32 which bracket is located close to ground level, for example, a road designated R. The trailer is therefore designed such that the support member 32 lies just above the road R, for example as low as two inches as desired. Consequently, the height of the load carried by the present trailer in comparison with the heights of loads capable of being carried by standard low boys can be substantially increased and to just slightly less than the maximum height permitted by state laws.

Figure 17A:
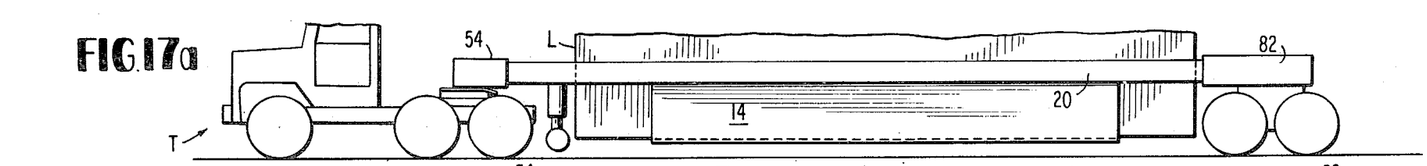
FIGS. 17a—17f are schematic side elevational views illustrating the manner in which the trailer construction hereof is self-unloaded.
Figure 17B:
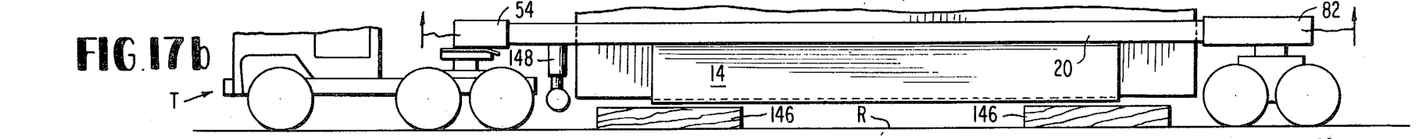
Figure 17C:
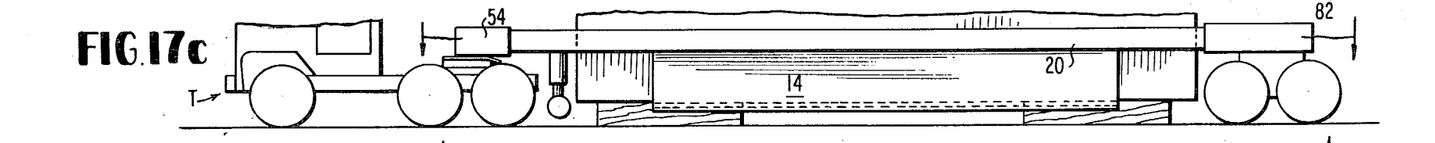
Figures 17D, 17E:
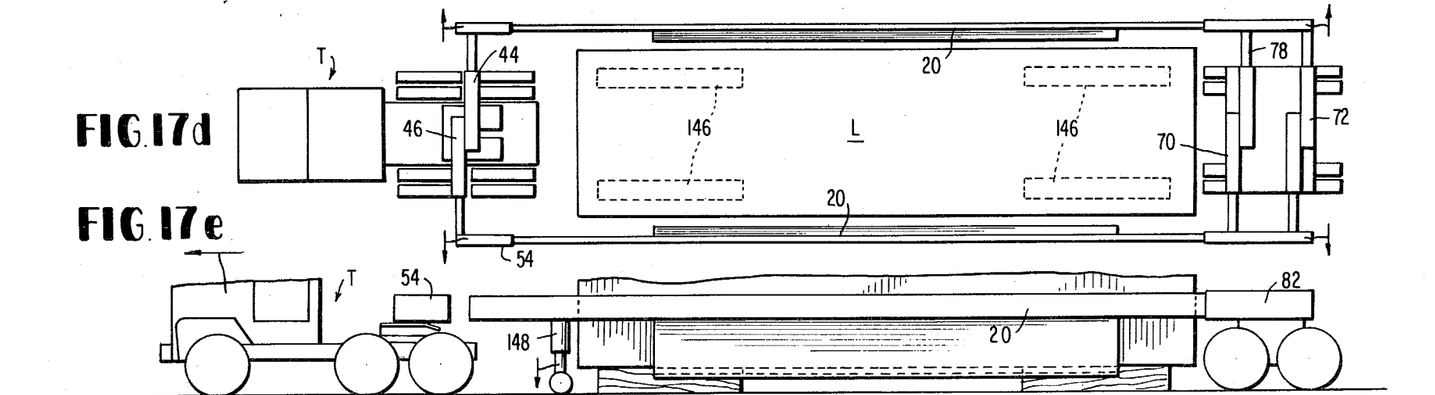
Figure 17F:
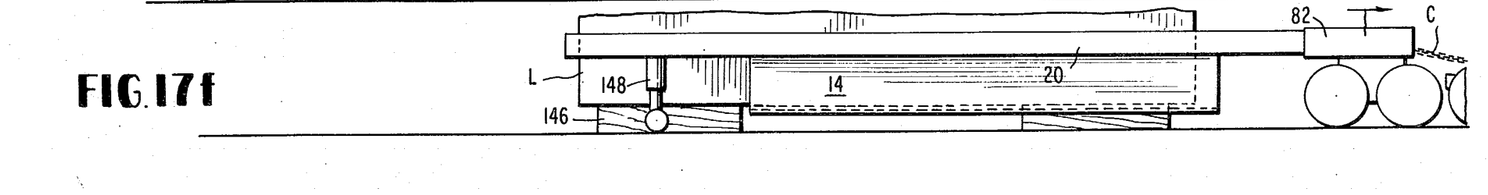

Further features of the present invention reside in the capability of the trailer construction for both self-loading and self-unloading. For example, to self-unload the trailer and with reference particularly to FIGS. 17A–17F, the load L is first raised a slight distance, for example three or four inches by using the standard airlift on the fifth wheel and rear axle. With load L spaced above the road level R a distance approximately 6 or 7 inches, blocks 146 may be interposed between the bottom of the load and road R. Also, it will be appreciated that fluid actuated dollies 148 may be provided and secured to the underside of beams 20 adjacent the front of trailer 10. These dollies may be hinged to fold back into a longitudinal position underneath the beams 20 or may be removably secured to the trailer, for example by bolting the dollies to the beams at various positions therealong as desired. Once the load is raised and the blocks 146 inserted as illustrated in FIG. 17B, the airlift system is operated to lower the trailer as illustrated in 17C. Lowering the trailer enables the load L to engage blocks 146 and transfers the weight of the load from the angle members to blocks 146. With the load support flanges 48 of the angle members spaced slightly below the lower side of the load, the cylinders 64, 66, 86 and 88 are actuated to displace the side trusses 12 and 14 away from one another and hence away from the load L therebetween as illustrated in FIG. 17D. The dollies 148 are then lowered as illustrated in 17E. Pins 58 between the forward channel boxes and channels 20 are then removed whereby tractor T including its fifth wheel is disconnected from the forward end of the trailer. The tractor T is driven forwardly to remove the channel boxes from the ends of beams 20, the tractor advancing with the end connection means leaving the trailer to rest on road R on dollies 148 and the rear axle unit. The tractor T is then driven to the rear of the trailer and suitably connected, for example by a chain indicated C in FIGS. 17F, to the rear axle. The trailer is then displaced longitudinally to clear the load. Once clear, the tractor T is disconnected from the rear axle unit and reconnected with the front of the trailer. When reconnected, the fifth wheel and rear axle unit airlifts are again actuated to elevate the truss. The dollies 148 can then be removed or hinged back to a stored position. Cylinders 64, 66, 86 and 88 are also retracted to displace the side trusses toward one another whereby the trailer again obtains a conventional width.

To load the trailer the foregoing described procedure is essentially reversed. That is, the side trusses are expanded to a width greater than the width of the load. The dollies are extended and the pins 85 are removed. The tractor T is then driven forwardly away from the front end of the trailer leaving it open and the side trusses supported by the forward dollies' wheels and the rear axle unit. The tractor T is then driven such that it bears against the rear axle unit whereupon the trailer is pushed open end first to straddle the load. Guide channels may be utilized to guide the dolly wheels during forward movement of the trailer. The tractor T is then reconnected to the trailer at its front end simply by backing the tractor toward the trailer with the forward ends of the beams being receivable within the channel boxes of connecting means 16 and pinned thereto. The fifth wheel airlift or the auxiliary airlift for the forward end of the trailer illustrated in FIGS. 7 and 8 or the truss raising mechanism disclosed in FIGS. 11 and 12 may be utilized to elevate the trusses such that the dolly wheels are off road R. The cylinders 64, 66, 86 and 88 are then retracted to move the side trusses toward one another such that the flanges 42 of the lower support members 32 lie below the load on its opposite sides. The side trusses are then again raised by the fifth wheel and rear axle unit airlift or the auxiliary airlift mechanisms described herein and illustrated in FIGS. 7–8 and 11–12, whereupon the weight of the load is transferred from the blocks to the trusses. The load is then secured to the trailer by bolting, chaining or booming and is ready for hauling.

The invention may be embodied in other specific forms without departing from the spirit or essential characteristic thereof, The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United Stated Letters Patent is:

1. A trailer construction for carrying a load comprising:
 a pair of spaced elongated side trusses including an elongated upper beam, a plurality of structural members carried by each truss and depending from the beam thereof, means carried by each truss and connected to the depending members adjacent their lower ends for supporting a load between said trusses, means connecting said trusses one to the other adjacent opposite ends thereof thereby defining an open area between the opposed side trusses and the opposed end connecting means whereby said trusses and said end connecting means are adapted to respectively straddle a load in said open area long the respective opposed sides and ends thereof, means carried by said trailer construction at each of the opposite ends thereof for displacing said trusses toward and away from one another, and means coupled to said connecting means at opposite ends of said trailer construction for connecting the trailer construction to wheeled supports adjacent its opposite ends, wherein the connecting means at one end of said trailer construction includes a guide carried thereby intermediate said trusses, an element carried by each side truss is movable toward and away from one another, and fluid actuated means carried by the trailer construction between said trusses for moving said trusses toward and away from one another, said apparatus including means coupling said elements and said side trusses for vertical movement of said side trusses relative to said elements; means carried by said trailer and cooperable between said side trusses and said element for moving said side trusses relative to said elements.

2. Apparatus according to claim 1 wherein the said guide extends laterally of said trailer and comprises guide tubes with their inner ends overlapping and being secured one to the other whereby said tubes are longitudinally offset one from the other, said elements carried by said trusses being receivable within said guide tubes through the open opposite ends thereof, said fluid actuated cylinders being connected between said tubes and the opposed beams respectively.

3. Apparatus according to claim 1 wherein said load supporting means includes a flange carried by each said side truss substantially coextensively therewith and inturned laterally toward the opposite side truss.

4. Apparatus according to claim 1 including a wheeled unit for supporting said trailer at one end thereof, and means carried by said wheeled unit for raising and lowering said trusses.

* * * * *